(12) United States Patent
Perry (10) Patent No.: US 11,693,941 B2
(45) Date of Patent: Jul. 4, 2023

(54) MULTI-FACTOR AUTHENTICATION FOR ACCESS CONTROL USING A WEARABLE DEVICE

(71) Applicant: ProdataKey, Inc., Draper, UT (US)

(72) Inventor: Joshua Perry, Sandy, UT (US)

(\*) Notice: Subject to any disclaimer, the term of this patent is extended or adjusted under 35 U.S.C. 154(b) by 73 days.

(21) Appl. No.: 17/120,002

(22) Filed: Dec. 11, 2020

(65) Prior Publication Data
US 2021/0184858 A1 Jun. 17, 2021

Related U.S. Application Data

(60) Provisional application No. 62/946,835, filed on Dec. 11, 2019.

(51) Int. Cl.
| | |
|---|---|
| G06F 21/34 | (2013.01) |
| H04L 9/32 | (2006.01) |
| G07C 9/00 | (2020.01) |
| G06F 21/31 | (2013.01) |
| G06F 21/35 | (2013.01) |

(52) U.S. Cl.
CPC .............. *G06F 21/34* (2013.01); *G06F 21/31* (2013.01); *G06F 21/35* (2013.01); *G07C 9/00904* (2013.01); *H04L 9/3234* (2013.01); *H04L 9/3271* (2013.01)

(58) Field of Classification Search
None
See application file for complete search history.

(56) References Cited

U.S. PATENT DOCUMENTS

| | | | |
|---|---|---|---|
| 8,430,310 B1* | 4/2013 | Ho | G06F 21/35 235/382 |
| 9,762,581 B1* | 9/2017 | Wang | H04L 63/102 |
| 9,942,222 B1* | 4/2018 | Fenton | H04L 63/0853 |
| 10,083,443 B1* | 9/2018 | Steshenko | G06Q 20/3278 |
| 10,701,067 B1* | 6/2020 | Ziraknejad | H04W 12/63 |
| 2011/0214158 A1* | 9/2011 | Pasquero | H04B 5/00 726/2 |
| 2014/0279528 A1* | 9/2014 | Slaby | G06F 1/163 455/411 |

(Continued)

OTHER PUBLICATIONS

Agadakos I, Hallgren P, Damopoulos D, Sabelfeld A, Portokalidis G. Location-enhanced authentication using the IoT: Because you cannot be in two places at once. In Proceedings of the 32nd Annual Conference on Computer Security Applications Dec. 5, 2016 (pp. 251-264). (Year: 2016).*

*Primary Examiner* — James R Turchen
(74) *Attorney, Agent, or Firm* — Morriss O'Bryant Compagni Cannon, PLLC (57) ABSTRACT

A system and method for providing multi-factor authentication for access through a door, but without the user having to repeat a physical act of providing authentication every time that the door is opened, wherein the first time through the door, multi-factor authentication is provided to the access control system, and wherein each subsequent access through the door, multi-factor authentication is performed automatically and without intervention of the user as long as the user has a wearable device providing at least one factor of the multi-factor authentication, and the user has not removed the wearable device since the multi-factor authentication was last provided to the access control system.

2 Claims, 3 Drawing Sheets

(56) References Cited

U.S. PATENT DOCUMENTS

| | | | | |
|---|---|---|---|---|
| 2014/0282878 | A1* | 9/2014 | Ignatchenko | G06Q 20/321 |
| | | | | 726/3 |
| 2015/0286813 | A1* | 10/2015 | Jakobsson | G06F 21/35 |
| | | | | 726/9 |
| 2015/0304322 | A1* | 10/2015 | Zaidi | G06V 40/70 |
| | | | | 382/115 |
| 2016/0080154 | A1* | 3/2016 | Lee | H04L 9/3234 |
| | | | | 713/185 |
| 2016/0154952 | A1* | 6/2016 | Venkatraman | G06Q 20/40145 |
| | | | | 726/19 |
| 2016/0224776 | A1* | 8/2016 | Leow | G06F 21/32 |
| 2016/0294817 | A1* | 10/2016 | Tan | H04L 63/0861 |
| 2016/0337863 | A1* | 11/2016 | Robinson | H04W 4/021 |
| 2018/0332033 | A1* | 11/2018 | Lakhani | G06F 21/35 |
| 2019/0171800 | A1* | 6/2019 | Mukundala | G06F 21/316 |
| 2019/0357049 | A1* | 11/2019 | Tali | H04W 12/64 |
| 2020/0052905 | A1* | 2/2020 | Mathias | H04L 9/006 |
| 2020/0356976 | A1* | 11/2020 | Senguttuvan | G06Q 20/3278 |
| 2021/0160235 | A1* | 5/2021 | Lerner | G06F 16/27 |
| 2022/0171839 | A1* | 6/2022 | Eidam | A61B 5/6801 |

* cited by examiner

MULTI-FACTOR AUTHENTICATION FOR ACCESS CONTROL USING A WEARABLE DEVICE

BACKGROUND

Field of the Invention

This invention relates generally to access control systems. Specifically, the invention pertains to a system and method for enabling a user to authenticate an identity using multi-factor authentication by using a wearable device in combination with a cell phone in order to unlock an access controlled door, wherein a user only has to perform a multi-factor authentication procedure once by entering a PIN or by providing biometric data, and then be able to unlock the door automatically and without having to swipe a card or reenter the PIN or provide biometric data, as long as the wearable device is not removed from the user between access attempts.

Description of Related Art

Prior art access control systems may require a user to manually repeat the same access procedure every time that a door or other access point is unlocked. For example, the user may have to swipe a card, enter a personal identification number (PIN) or provide biometric data, or some combination of these manual procedures. The procedure may vary and may even require that more than one process be completed to unlock a door. No matter what particular access control system is being used, the user may have to repeat the same access procedure every time that the door is opened by the user.

It would be an advantage over the prior art to provide a new system and method for providing access through a door that does not require the user to repeat the manual process of providing some identifying information either through the swiping a card, providing a PIN, or providing biometric data in order to gain access through a locked door. It would be an advantage to eliminate the step of the user having to perform any procedure to unlock the door other than to approach it and open it and thereby gain access.

However, even though a manual procedure is not repeated, the access system must still include multi-factor authentication to the access control system each time that the user passes through the door.

BRIEF SUMMARY

The present invention is a system and method for providing multi-factor authentication for access through a door, but without the user having to repeat a manual act of providing authentication every time that the door is opened, wherein the first time through the door, manual performed multi-factor authentication must be provided to the access control system, but wherein each subsequent access through the door, multi-factor authentication is performed automatically and without intervention of the user as long as the user has complied with certain requirements that do not terminate the multi-factor authentication that has been established, such as a user having a wearable device providing at least one factor of the multi-factor authentication, and the user has not removed the wearable device since the multi-factor authentication was last established with the access control system.

DETAILED DESCRIPTION

Reference will now be made to the drawings in which the various embodiments will be given numerical designations and in which the embodiments will be discussed so as to enable one skilled in the art to make and use the embodiments of the disclosure. It is to be understood that the following description illustrates embodiments of the present disclosure and should not be viewed as narrowing the claims which follow.

The embodiments of the present invention are shown providing a system and method for enabling a user to authenticate an identity to an access control system using multi-factor authentication associated with a wearable device in order to gain access through an access controlled door.

Multi-factor authentication has been used in computer networks and has been an electronic authentication method in which a computer user is granted access to a website or application only after successfully presenting two or more pieces of evidence to an authentication mechanism: knowledge, possession, and inherence. Thus, multi-factor authentication is typically presented as authentication layers, where authentication typically consists of one of the following variables and some combination of knowledge, possession and inherence.

Those skilled in the art of computer authentication understand that knowledge is something you know, which is generally an email address, ID number, or username and password, although it can also include custom security questions and CAPTCHA verification. Possession is defined as something you have, which could be an email verification link, one-time password (OTP), identification badge, keycard, or browser cookie. Finally, inherence is defined as something you are, including biometrics such as retinal scans, fingerprints, voice recognition, or facial ID recognition.

Any combination of these variables creates a multi-factor authentication process, which sometimes requires user participation but can also be done discreetly, as in the case of cookie authentication. Authentication occurs most or all times that a user attempts to access a program, network, device, etc.

Basic authentication may compare a variable from the user with something that is stored in the system being accessed. In the case of username and password, for example, the credentials a user enters at login will be cross referenced with a database of stored usernames and corresponding passwords. If both credentials match, the user will be granted access. If one or both credentials are invalid, an error message may be returned, although different scenarios may return different messages. In particularly sensitive or high-risk login situations, too many unsuccessful authentication attempts may cause account lockout, where a user must take extra steps to authenticate their identity Not all authentication scenarios involve gaining access to electronic data. For example, consider the situation of a user needing to pass through a door that is operated by an access control system. The access control system may allow entry to anyone who can provide the proper credentials to the access control system. The problem in current systems is that the user must provide authentication to the access control system each time that the user opens a controlled door by performing some manual task such as swiping a card, entering a PIN at a panel, etc.

The embodiments of the invention enable the user to manually perform one or more tasks to provide the proper credentials when passing a first time through a door, as in the prior art. However, all subsequent movements of that user through the door do not require the user to perform any manual tasks in order to provide the proper credentials. The access control system will automatically interact with an electronic device on the user to authenticate the user's credentials and allow the user to open the door.

It should be understood that authentication of the user's credentials will incorporate multi-factor authentication that will be performed automatically and will involve using a combination of at least two electronic devices, wherein one of the electronic devices is a wearable device.

In the first embodiment of the invention, the credentials of the user are going to be limited to two items of authentication. Thus, multi-factor authentication for the first embodiment will be limited to two authentication items.

The first electronic device of the user may be a smart phone that is running an authentication program that is compatible with the access control system. For example, it may be an Apple™ iPhone™ or a smart phone running the Android™ Operating System. The authentication program may be an application (App) that will run on the Operating System of the device. The authentication program may also run in the background of the Operating System.

In contrast, there are several conditions that the second electronic device must meet in order to provide the desired multi-factor authentication in the first embodiment. First, the second electronic device must be a wearable device that is able to determine whether or not it is in physical contact with the skin of the user. It may be assumed that hereinafter in this document that the term physical contact means contact with the skin of the user.

Second, the wearable device must be able to determine if physical contact is terminated with the user.

Third, the wearable device must be able to communicate with the first electronic device so that the first electronic device is always communicating information relevant to both the first and the second electronic devices.

The purpose of this communication is so that the first and the second electronic devices may always inform the access control system whether or not there has been a change in the status of the credentials of the user. Thus, the next time that the user attempts to open a controlled door, the first electronic device with either confirm that the credentials are still valid or indicate that they are no longer valid.

The only reason that the credential will no longer be valid are because at some time, the user broke physical contact with the second electronic device. The user may or may not be aware that contact was lost. Nevertheless, the first electronic device will update the status of the user's credentials to the access control system. If physical contact was lost with the second electronic device, the user will have to re-authenticate the multi-factor authentication of the user.

A feature of the first embodiment is that the wearable device does not have to communicate directly to the access control system to inform it that the status of the user's credentials has changed. For example, the first electronic device may be informed by the wearable device that physical contact was interrupted with the user. Alternatively, the first device may be capable of determining a status of the wearable device by periodically querying the wearable device about its contact status with the user.

What is important is that the first electronic device must communicate with the access control system when the user is attempting to gain access to a door by informing the access control system that its credentials are invalid. The user will then need to re-authenticate its credentials using multi-factor authentication to again gain access through a controlled door.

It should therefore be understood that the first electronic device and the second electronic device are executing an authentication program that is compatible with the access control system. However, the authentication program on the first electronic device may not be the same version of the program running on the second electronic device.

In an alternative embodiment, the second electronic device may also be capable of communicating with the access control system and provide a status of the user's credentials on that second electronic device.

A feature of the first embodiment is that the second electronic or wearable device may be any convenient wearable device that is normally in constant physical contact with the user when being worn. For example, a common wearable device is a watch or fitness band that is worn on the wrist of a user. What is important is that the wearable device must have physical contact and that the contact must remain constant in order to maintain the credentials of the user.

Once the user performs a manual authentication process or procedure to provide multi-factor authentication, this procedure should not have to be performed again by the user as long as authentication is not broken, and the status of the credentials have not changed. Every subsequent movement of the user through the door should occur without user intervention. The user should only have to open the door and move through.

It was explained above that multi-factor authentication of the user may be broken or terminated. This termination may be triggered automatically as explained above or by manual intervention of a person with the necessary access to the access control system.

As explained above, automatic termination of multi-factor authentication of the user may occur when the user performs some physical task. For example, if the user performs the physical task of removing the wearable device so that it is no longer in physical contact with the user, the removal is detected by the second electronic device of the user. The authentication program running on the first and second electronic devices then changes the status of the credentials of the user to a terminated or invalid state and this information is transmitted to the access control system the next time that the user attempts to pass through a controlled door and gain access to a secure location. The user must again perform the manual multi-factor authentication procedure to have the credentials of the user re-authenticated.

Figure 1:
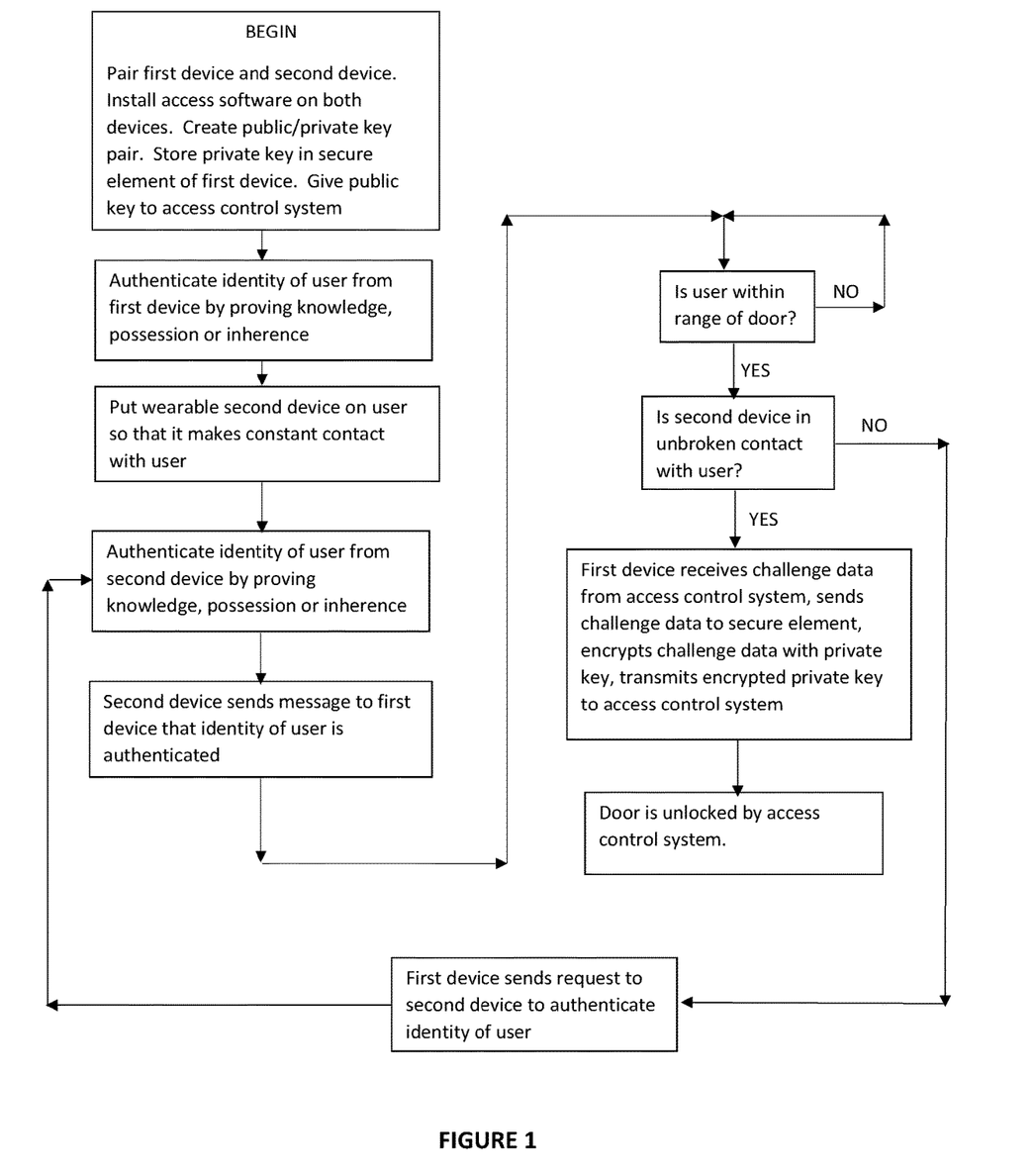
FIG. 1 is a flowchart of the steps in a first embodiment of the present invention that requires two-factor authentication of the user before a door is unlocked, and then having the door automatically unlocked whenever the user subsequently approaches the door.

FIG. 1 is a flowchart that illustrates the steps of the first embodiment of the invention. The first step is to prepare the first and the second electronic devices by pairing them and installing whatever authentication program is needed in both electronic devices in order to provide authentication information to the access control system. A public/private key pair may also be created, and the private key installed in the secure element of the first electronic device and the public key given to the access control system.

The next step may be to authenticate the credentials of the user on the first electronic device. The user may prove identity by proving knowledge, possession, or inherence.

The next step is to put the wearable second device on the user. The user may then authenticate the identity of the user using the software that was installed on the first and the second electronic devices. The user may prove identity by proving knowledge, possession, or inherence.

The next step is for the second electronic device to inform the first electronic device that the user has been authenticated. This authentication of the user remains valid as long as the user does not break physical contact with the second electronic device. If contact is lost, the second electronic device informs the first electronic device that the authentication of the user is no longer valid.

The user then approaches the door to be unlocked that is operated by the access control system. If the user has already authenticated identity of the user with the first electronic device and the second electronic device and the second electronic device is in communication with the first electronic device and given the first electronic device the authentication status of the second electronic device, then the first electronic device is ready to transmit authentication credentials to the access control system.

The next step is for the access control system to send challenge data to the first electronic device when the first electronic device is in range. The challenge data may be random so that no one can use a recording of a response to the challenge data from the first electronic device and use that information to unlock the door a second time.

The next step is for the first electronic device to send the challenge data to the secure element within the first device. The secure element then encrypts the challenge data with the private key stored in the secure element. The first electronic device then transmits the encrypted private key back to the access control system. This encrypted private key may only be used one time because of the randomized challenge data.

The access control system then receives the encrypted private key and using the public key that it already has for the user, authenticates the user and completes two-factor authentication and unlocks the door.

The first electronic device will not send the challenge data to the secure element within the first device or encrypt the challenge data with the private key stored in the secure element if the first electronic device has not received authentication data from the second electronic device. The first electronic device may simply not respond and therefore the user will not pass through the door if the credentials of the user have not been authenticated by both the first and the second electronic devices.

It should be apparent from the explanation above that authentication of the user's credentials may take at any time before the user approaches a door, but it does not have to take place ahead of time. Authentication may take place on both electronic devices at the door and not ahead of time.

Figure 2:
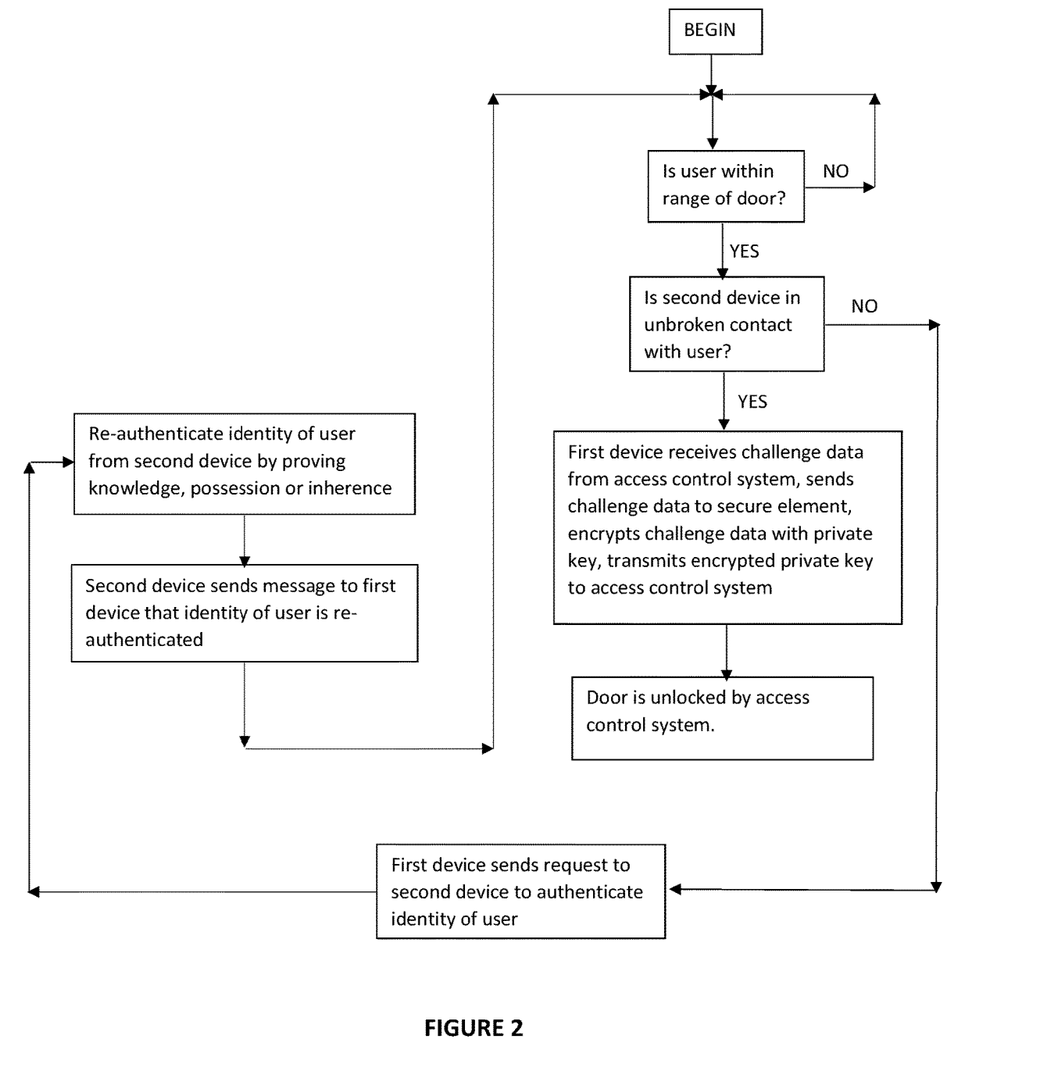
FIG. 2 is a flowchart of the steps in a second embodiment of the present invention.

FIG. 2 is a flowchart describing what happens the next time that a user approaches a door after having completed the process described in FIG. 1. Specifically, the user's credentials have now been authenticated and the user has passed through the door a first time.

The first step is for the user to approach the door to be unlocked that is operated by the access control system. The user has already authenticated identity of the user with the first electronic device and the second electronic device and the second electronic device is in communication with the first electronic device and given the first electronic device the authentication status of the second electronic device. Thus, the first electronic device is ready to transmit authentication credentials to the access control system without the user performing any physical tasks and proving knowledge, possession or inherence.

The next step is for the access control system to send challenge data to the first electronic device when the first electronic device is in range. The challenge data may be random so that no one can use a recording of a response to the challenge data from the first electronic device and use that information to unlock the door a second time.

The next step is for the first electronic device to send the challenge data to the secure element within the first device. The secure element then encrypts the challenge data with the private key stored in the secure element. The first electronic device then transmits the encrypted private key back to the access control system. This encrypted private key may only be used one time because of the randomized challenge data.

The access control system then receives the encrypted private key and using the public key that it already has for the user, authenticates the user and completes two-factor authentication and unlocks the door.

However, if the second electronic device lost contact with the user, the user credentials are now invalid. The first electronic device may then request the second electronic device to re-authenticate the user. Once the user has been re-authenticated, the first electronic device may then respond with the encrypted private key and the door is unlocked for the user.

More detail regarding the first electronic, the second electronic device, and all of the steps described in FIGS. 1 and 2 may be useful to fully appreciate the embodiments of the invention.

The first step of the first embodiment is to validate the credentials of the user by manually performing a multi-factor authentication process. In this example, consider a user who has a smart phone such as an Applem iPhonem or an Androidm device that may function as the first electronic device of the user. The user may also be wearing a smart watch such as an Applem Watch, a watch that is compatible with an Androidm phone, a fitness band, or any other wearable electronic device that is functioning as the second electronic device and is also capable of running the authentication program.

The user may approach the controlled door that is operated by the access control system. The user then activates the authentication program on the first electronic device that transmits a signal to the access control system to request access or waits for a signal from the access control system when the user approaches. Regardless of which device transmits first, the access control system may send challenge data to the first electronic device.

In the prior art, the first electronic device may respond by transmitting data that is coupled to the challenge data. For example, the first electronic device may respond with a private key that is attached to the challenge data and sent back to the access control system. The access control system then verifies the private key and either permits or prevents access through the door. It should be understood that the access control system must already have the public key of the public/private key of the user.

If the first device provides the only authentication that is needed, this is referred to as single-factor authentication. While the prior art may be satisfied with the first electronic device responding with the private key and the access control system unlocking the door, the first embodiment of the present invention requires multi-factor authentication. One reason for the need of an improvement is that the first electronic device could be lost by the owner and used to gain access through the door simply by possession.

In contrast, the first embodiment of the invention is an improvement over the prior art by requiring the user that is in possession of the first electronic device to also have at least a second electronic and wearable device. As explained previously, the second electronic device is a wearable device that is in constant physical contact with the user and may be a watch, a ring, a band, a bracelet, a choker or any other wearable device that maintains physical contact with the user.

The importance of the physical contact is critical to the first embodiment. Breaking physical contact for even a moment will result in cancellation of any previously authorized multi-factor authentication of the credentials of the user that was previously provided by the combination of the first and the second electronic devices.

Returning to the process of multi-factor authentication, the user has come within range of the access control system, and the access control system and the first electronic device have communicated. In this communication, the access control system may have transmitted challenge data to the first electronic device.

The first embodiment requires that the user must perform some physical tasks to enable the first electronic device and the second electronic device to authenticate the credentials of the user. As explained previously, the evidence needed for multi-factor authentication may be in the form of knowledge, possession, or inherence.

Accordingly, the user must now perform some physical tasks. These tasks may be the entering of a code on the first and/or the second electronic devices, unlocking the first and/or the second electronic devices, the entering of a code on one or both of the electronic devices, entering biometric data in one or both of the electronic devices, or any combination of knowledge, possession, or inherence.

For example, the user may have to provide information which is something the user must know such as a PIN (code) or swipe a card which is something the user has or provide some biometric data such as a fingerprint or facial ID which is something that the user is.

It should be understood that the examples given above as some of the types of physical tasks that may be performed by the user are not limited to these examples only, and that any form of knowledge, possession, or inherence may be used to validate the credentials of the user.

Once the user has performed the physical tasks using the first and second electronic devices, the authentication program running on the first and the second electronic devices may respond to the access control device by, for example, returning the challenge data with new authentication data attached. What is important is that the first and the second electronic devices transmit a signal to the access control system with data.

The next step is for the access control system to authenticate the data that was transmitted from the first and the second electronic devices. It is envisioned that only one of the electronic devices may respond to the access control device and will typically be a function performed by the first electronic device. However, it should be understood that one or both of the electronic devices may communicate with the access control system and should be considered to be within the scope of the invention.

Accordingly, when the user approaches the door for the first time in a given day and either receives challenge data or the first electronic device requests challenge data, the challenge data may be received by the first electronic device. The user then provides at least one factor authentication from the first electronic device and at least one factor authentication from the second electronic device.

It is stated that each of the electronic devices must provide at least one form of authentication because each of the electronic devices may be capable of providing more than one form of authentication. Nevertheless, in this first embodiment, each of the electronic devices is providing a single form of authentication to thereby obtain multi-factor authentication.

Some examples of the physical tasks that may be performed with the first and the second electronic devices include, but should not be considered as limited to, unlocking an electronic device, entering a PIN, providing a fingerprint, providing facial ID, providing a voice sample, or providing a retinal scan.

It is also a requirement that the second electronic device be in physical contact with the user when these physical tasks are being performed.

Once the multi-factor authentication data has been provided to the access control system, the access control system authenticates the credentials of the user. If the credentials are authenticated, then the access control system unlocks the door for the user.

The user has now completed multi-factor authentication of the user's credentials. As long as physical contact between the user and the second electronic or wearable device is not broken, the user now has a different type of access to doors operated by the access control system that is not found in the prior art.

Another aspect of the first embodiment of the invention is that the next time that a user approaches a door under control of the access control system, the access control system will communicate with the first electronic device. If the first electronic device has not received a signal or has not detected that the second electronic device has broken contact with the user since the multi-factor authentication was established, the first electronic device will again respond with multi-factor authentication credentials of the user, but without the user performing any physical tasks on the first or the second electronic devices. The user will walk right through the door that has just been unlocked by the access control system.

The user will continue to walk unhindered through doors and always provide multi-factor authentication credentials to the access control system each time.

One of three actions can take place that will invalidate the credentials of the user. First, the user may break physical contact with the second electronic or wearable device. Second, the access control system may erase the credentials because the credentials have expired. For instance, the credentials may only be valid for a predetermined number of hours, or the access control system may invalidate all or some credentials for users on a daily basis. Last, the credentials may be terminated by an operator of the access control system. For example, a security guard may access the system and manually terminate credentials of a particular user.

In summary, in the first embodiment, multi-factor authentication is achieved using the first and second electronic devices by having possession of the first and second electronic devices and by performing physical tasks to authenticate the user using some combination of knowledge, possession and inherence.

In a second embodiment of the invention, it should be understood that multi-factor authentication may be used to require that at least one electronic device provide more than one form of authentication, or that at least a third electronic device be operated by the user to provide at least one form of authentication. In this way, at least three forms of authentication are being provided by the user.

Thus, the second embodiment of the invention provides more than two factors of authentication. For example, a third device may be required for authentication. The third device may be a wearable device, or it may not be. The third device may just have to be in the possession of the user, or it may require some interaction to confirm the identity of the user. Authentication may again be in the form of a PIN or some sort of biometric data, or it may be something in the possession of the user such as a smart card. The authentication will be in the form of knowledge, possession, or inherence.

The third electronic device may not necessarily be running an authentication program. For example, the third electronic device may be a smart card or any card that contains an RFID chip that may be activated by a signal from a reader that is connected to the access control system.

Figure 3:
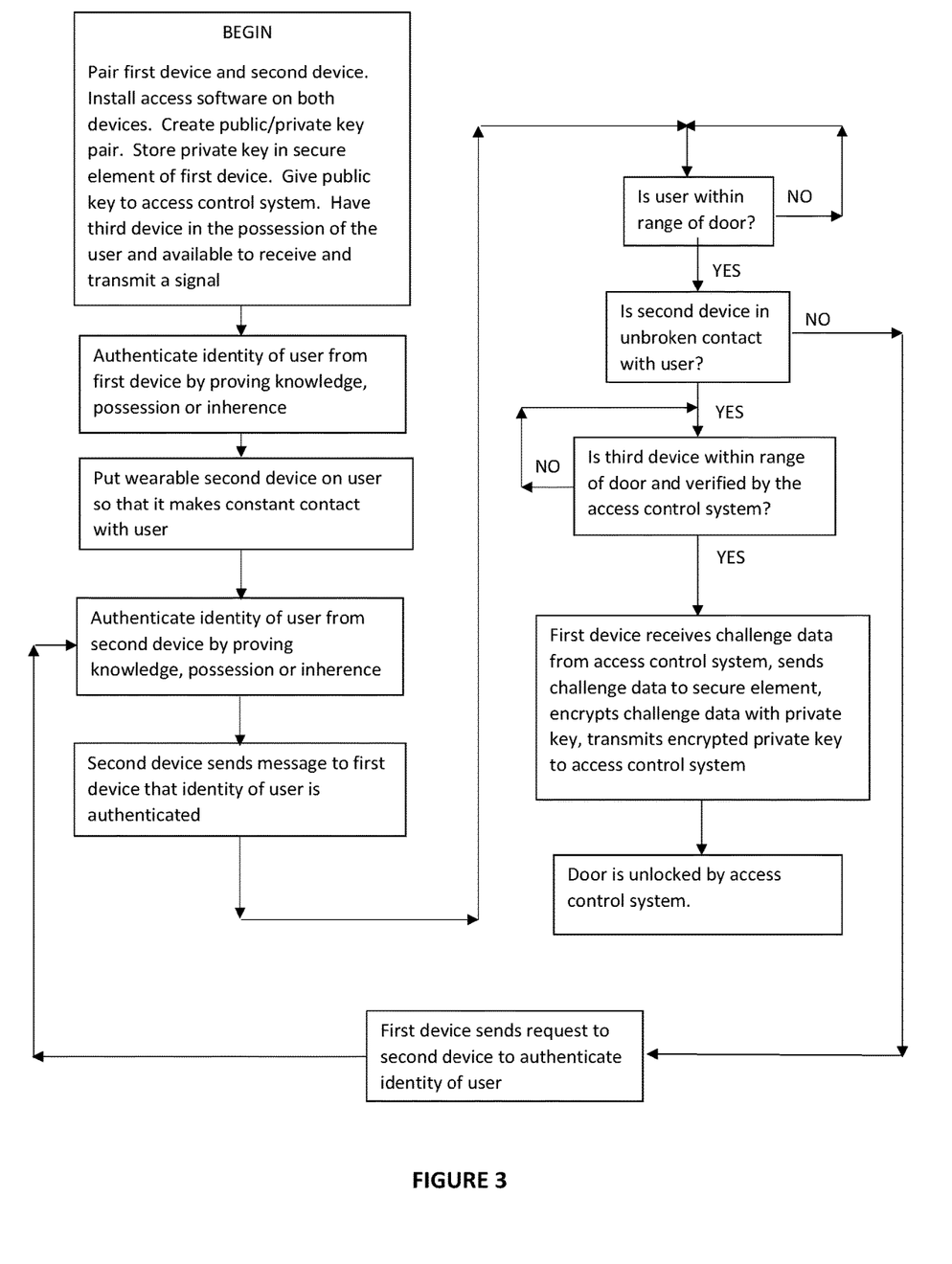
FIG. 3 is a flowchart of the steps in a second embodiment of the present invention.

FIG. 3 is provided as a flowchart of the steps that may be taken when a third device is being used to authenticate the user. The changes include having the third device in the possession of the user and positioned so that it may receive and transmit a signal if it is a smart card. The next change is to have the access control system verify the presence of the third device before the first electronic device encrypts data for transmission to the access control system.

In the first or the second embodiments, once the two-factor or at least three factor authentication has taken place, the next time that the user approaches the door, the user does not need to perform any acts of authentication. In the first embodiment, as long as the second electronic device has not broken physical contact with the user, the first electronic device will automatically authenticate the user and provide the required authentication data from the first electronic device to the access control system.

However, once the second electronic device has broken contact with the user, for example, when the user removes the second electronic device, then the first electronic device will no longer automatically provide the authenticated credentials to the access control system. The user must confirm identity by performing the manual procedures of multi-factor authentication again.

It should be understood that authentication data such as a private key may be stored within the first electronic device in an area that is secure within the first electronic device. In an Apple™ device, the authentication data may be stored in a secure element (SE) as understood by those skilled in the art. In an Android™ device, the private key may be stored in the functional equivalent of the secure element.

It should be understood that in the embodiments of the invention that the first electronic device may set policies on when cryptographic material may be accessed from the secure element. Details for encryption operations never leave the secure element of the first electronic device.

Furthermore, since the authentication data being used may be asymmetrical keys, it may only be necessary to have the public half of the key to assert the identity of the user, while the private half of the key never leaves the secure element. Furthermore, the secure element may not even have operations to move the private data out of a chip, making the private data more secure than many other types of tokens.

In another aspect of the embodiments of the invention, the identity of the user may not have to be authenticated by the user on the second electronic device only at the time that access is requested through the door for the first time. Thus, the user may provide authentication data to the second electronic device at any time before the user approaches the door, and the credentials may remain authenticated as long as the second electronic device does not break contact with the user.

For example, a user may awake in the morning and unlock a wearable device such as a watch using a fingerprint or a PIN. The authentication of the user may then be cached until it is requested by the first electronic device or until the user removes the second electronic device.

In another aspect of the embodiments, policies may be stored in the secure element that makes decisions inside a secure processor that determine what secure details the user may access based on constraints assigned by the policies that are stored regarding the second electronic device.

In another aspect of the embodiment, the user may create a public/private key pair inside the secure element. The public key may be sent to the access control system before the user tries to unlock a door. When the user is within range of a door, the access control system may automatically send challenge data to the first electronic device. The first electronic device may send back the challenge data signed with the private key information stored in the secure element of the first electronic device automatically if the user has already provided authenticated user identity on the second electronic device. If the second electronic device has not authenticated the user, then the user must provide authentication data to the second electronic device.

It should be understood that the first and second electronic devices must be within communication range of each other in order to function together. The distance between the first and second electronic devices may be a function of the method that the first and second electronic devices use to communicate. For example, the first and second electronic devices may communicate using the Bluetooth™ protocol.

It should be understood that the access control system does not accept the same authentication data twice, so it would be of no use to record the signal containing the private key from the first electronic device to the access control system to use at a later time. That is because the access control system always sends out randomized data as challenge data. Thus, the challenge data that is combined with the authenticated credentials is always unique.

In another aspect of the embodiments, if someone takes the first electronic device from the user and approaches the door, the first electronic device will likely have lost the connection to the second electronic device and thus the authentication context is lost, and the credentials are now invalid. The first electronic device may not answer the challenge data with the correct private key or may send a message that the credentials of the user are invalid.

In another aspect of the embodiments of the invention, one way to make the system more secure may be through attestation. The attestation feature is where the first electronic device itself can be involved in the signature chain and the device will attest to the fact that it signed the certificate inside the secure element. So even if someone was able to get the private key from the secure element, attestation would show that the signature occurred on a different electronic device.

In another aspect of the embodiments, an administrator may specify what factors of authentication that a user must provide. In other words, although many different forms of authentication may be available to the user, only particular forms of authentication may be used.

In summary, the first embodiment of the invention for providing multi-factor authentication of a user to an access control system using manual authentication of credentials, and never having to repeat manual authentication as long as the user does not invalidate the credentials, comprises the steps of first, pairing a first electronic device and a second electronic device to each other so they may communicate, wherein the first and the second electronic devices are running an authentication program that enables authentication of a user by proving knowledge, possession or inherence of the user, second, authenticating the identity of the user on the first electronic device, third, placing the second electronic device on the user such that the second electronic device remains in physical contact with the user, fourth, authenticating the identity of the user on the second electronic device, fifth, transmitting a signal from the second electronic device to the first electronic device that the user is authenticated, sixth, waiting for the user to come within range of an access control system of a door, and when the user comes within range, verifying that the second electronic device still has valid credentials for the user by not losing physical contact with the user, seventh, receiving challenge data at the first electronic device from the access control system, sending the challenge data to a secure element, encrypting the challenge data with a private key in the secure element, and transmitting the encrypted private key to the access control system, eighth, receiving the encrypted private key by the access control system and verifying that the user has valid multi-factor authentication credentials by verifying the encrypted private key, ninth, re-transmitting challenge data to the first electronic device whenever the first electronic device comes within range of the access control system and tenth, automatically sending the challenge data to the secure element, encrypting the challenge data with the private key in the secure element, and transmitting the encrypted private key to the access control system without having to re-authenticate the identity of the user.

Although the preceding description has been described herein with reference to particular means, materials, and embodiments, it is not intended to be limited to the particulars disclosed herein; rather, it extends to all functionally equivalent structures, methods, and uses, such as are within the scope of the disclosure. Accordingly, all such modifications are intended to be included within the scope of this disclosure. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for multi-factor authentication of a user to an access control system using manual authentication of credentials, and never having to repeat manual authentication as long as the user does not invalidate the credentials, said method comprising:

pairing a first electronic device and a second electronic device to each other so they may communicate, wherein the first and the second electronic devices are running an authentication program that enables authentication of a user by proving knowledge, possession or inherence of the user and wherein the second electronic device only communicates with the first electronic device;

authenticating the identity of the user on the first electronic device;

placing the second electronic device on the user such that the second electronic device remains in physical contact with the user;

authenticating the identity of the user on the second electronic device;

transmitting a signal from the second electronic device to the first electronic device that the user is authenticated;

waiting for the user to come within range of an access control system of a door, and when the user comes within range, verifying that the second electronic device still has valid credentials for the user by not losing physical contact with the user;

receiving challenge data at the first electronic device from the access control system, sending the challenge data to a secure element in the first electronic device, encrypting the challenge data with a private key in the secure element to create an encrypted private key, and transmitting the encrypted private key from the first electronic device to the access control system;

receiving the encrypted private key by the access control system and verifying that the user has valid multi-factor authentication credentials by verifying the encrypted private key;

re-transmitting challenge data to the first electronic device whenever the first electronic device comes within range of the access control system; and automatically sending the challenge data to the secure element, encrypting the challenge data with the private key in the secure element, and transmitting the encrypted private key to the access control system without having to re-authenticate the identity of the user.

2. A system for multi-factor authentication of a user to an access control system using manual authentication of credentials, and never having to repeat manual authentication as long as the user does not invalidate the credentials, the system comprising:

one or more processors; and one or more memories coupled to the processor, wherein the memory comprises instructions which, when executed by the processor, cause the processor to:

pair a first electronic device and a second electronic device to each other so they may communicate, wherein the first and the second electronic devices are running an authentication program that enables authentication of a user by proving knowledge, possession or inherence of the user and wherein the second electronic device only communicates with the first electronic device;

authenticate the identity of the user on the first electronic device;

place the second electronic device on the user such that the second electronic device remains in physical contact with the user;

authenticate the identity of the user on the second electronic device;

transmit a signal from the second electronic device to the first electronic device that the user is authenticated;

wait for the user to come within range of an access control system of a door, and when the user comes within range, verify that the second electronic device still has valid credentials for the user by not losing physical contact with the user;

receive challenge data at the first electronic device from the access control system, send the challenge data to a secure element in the first electronic device, encrypt the challenge data with a private key in the secure element to create an encrypted private key, and transmit the encrypted private key from the first electronic device to the access control system;

receive the encrypted private key by the access control system and verify that the user has valid multi-factor authentication credentials by verifying the encrypted private key;

re-transmit challenge data to the first electronic device whenever the first electronic device comes within range of the access control system; and automatically send the challenge data to the secure element, encrypt the challenge data with the private key in the secure element, and transmit the encrypted private key to the access control system without having to re-authenticate the identity of the user.

* * * * *